United States Patent [19]

Watanabe et al.

[11] Patent Number: 4,573,882
[45] Date of Patent: Mar. 4, 1986

[54] ELECTRICALLY OPERATED FUEL PUMP APPARATUS

[75] Inventors: Kiyohiko Watanabe, Chiryu; Kazuma Matsui, Toyohashi; Yoshiyuki Hattori, Toyoake; Toshihiro Takei, Kariya; Toshiaki Nakamura, Anjo; Shunsaku Ohnishi, Toyota, all of Japan

[73] Assignee: Nippondenso Co., Ltd., Kariya, Japan

[21] Appl. No.: 378,724

[22] Filed: May 17, 1982

[51] Int. Cl.<sup>4</sup> .......................... F04B 35/04; F04D 5/00
[52] U.S. Cl. ................................ 417/366; 417/423 R; 415/53 T; 415/213 T; 403/335
[58] Field of Search ........... 417/366, 205, 410, 423 R; 415/53 T, 213 T; 403/335, 336, 26, 380, 1, 348, 349

[56] References Cited

U.S. PATENT DOCUMENTS

| | | | |
|---|---|---|---|
| 1,200,143 | 10/1916 | Schrade | 403/335 |
| 2,068,803 | 1/1937 | Johnson | 418/91 |
| 2,720,765 | 10/1955 | Drexler | 403/335 |
| 3,658,444 | 4/1972 | Rhodes et al. | 415/53 T |
| 4,212,601 | 7/1980 | Ina | 417/366 X |
| 4,295,797 | 10/1981 | Ruhl et al. | 417/205 X |
| 4,445,820 | 5/1984 | Hayashi et al. | 417/366 |

Primary Examiner—Cornelius J. Husar
Assistant Examiner—Peter M. Cuomo
Attorney, Agent, or Firm—Cushman, Darby & Cushman

[57] ABSTRACT

An electrically operated fuel pump apparatus comprises an electric motor and a regenerative pump having a pump housing and a disc-like impeller. The motor shaft has an end portion extending into a central axial through-hole formed in an end wall of the pump housing. A joint member comprising a ring-like base and a circumferential row of axial rods extending therefrom is rotatably disposed in the axial through-hole in the end wall of the pump housing and secured to the end portion of the motor shaft. The impeller is rotatably and axially movably mounted on an impeller shaft provided separately of the motor shaft and secured to the other end wall of the pump housing. The impeller is formed therein with a circumferential row of axial apertures with which the axial rods of the joint member loosely engage to transmit the rotation of the motor shaft to the impeller while permitting axial movement of the impeller relative to the motor shaft and the pump housing.

3 Claims, 4 Drawing Figures

ELECTRICALLY OPERATED FUEL PUMP APPARATUS

BACKGROUND OF THE INVENTION

1. Field of the Invention

The present invention relates to an electrically operated fuel pump apparatus for use, for example, in an automobile to pump fuel from a fuel tank to an automotive internal combustion engine. More particularly, the invention is concerned with a fuel pump apparatus of the type that comprises a regenerative pump including a pump housing and an impeller driven by an electric motor.

2. Description of the Prior Art

In the prior art pump apparatus of the class specified above, the impeller is fixed by a fixing means, such as a key, to an extension of a shaft of the electric motor. In addition, the pump housing is coaxially fitted to a motor housing or to a bearing holder of the motor with a high accuracy.

Due to this construction of the prior art pump apparatus, the precision of the axial or side clearances and radial clearance between the pump impeller and housing depends on the perpendicularity and concentricity of the pump impeller and housing relative to the motor shaft. The perpendicularity and concentricity depend on the degree of precision of the structure of the connection between the pump and motor sections of the pump apparatus, namely, partly on the degree of precision of the connection between the pump housing and either the motor housing or the motor bearing holder and partly on the perpendicularity of either the motor housing or the motor bearing holder relative to the motor shaft. Accordingly, if the end portions of the pump housing and of either the motor housing or the motor bearing holder which are to be connected together are worked with a low degree of precision, the side and radial clearances between the pump impeller and housing cannot be kept within proper dimensions and thus the pump apparatus is inoperative to provide a high pumping performance. Due to the above-discussed structure of the pump apparatus, moreover, it is difficult to form motor shaft bearings by flexible bearing mechanisms such as self-aligning bearings. This makes it difficult to easily assemble component parts of the motor.

SUMMARY OF THE INVENTION

It is an object of the present invention to provide an improved electrically operated fuel pump apparatus which is free from the problems discussed above.

The electrically operated fuel pump apparatus according to the present invention comprises a regenerative pump including a pump housing and an impeller which is driven by an electric motor including a motor housing and a shaft. A second shaft is provided independently of the motor shaft to support the pump impeller. The impeller is axially movable and rotatable within the pump housing. The pump apparatus further includes a joint disposed between the motor shaft and the pump to transmit the rotation of the motor shaft to the impeller while allowing the impeller to move in the axial direction.

The above and other objects, features and advantages of the present invention will be made apparent by the following description with reference to the accompanying drawings.

DESCRIPTION OF A PREFERRED EMBODIMENT

Figure 1:
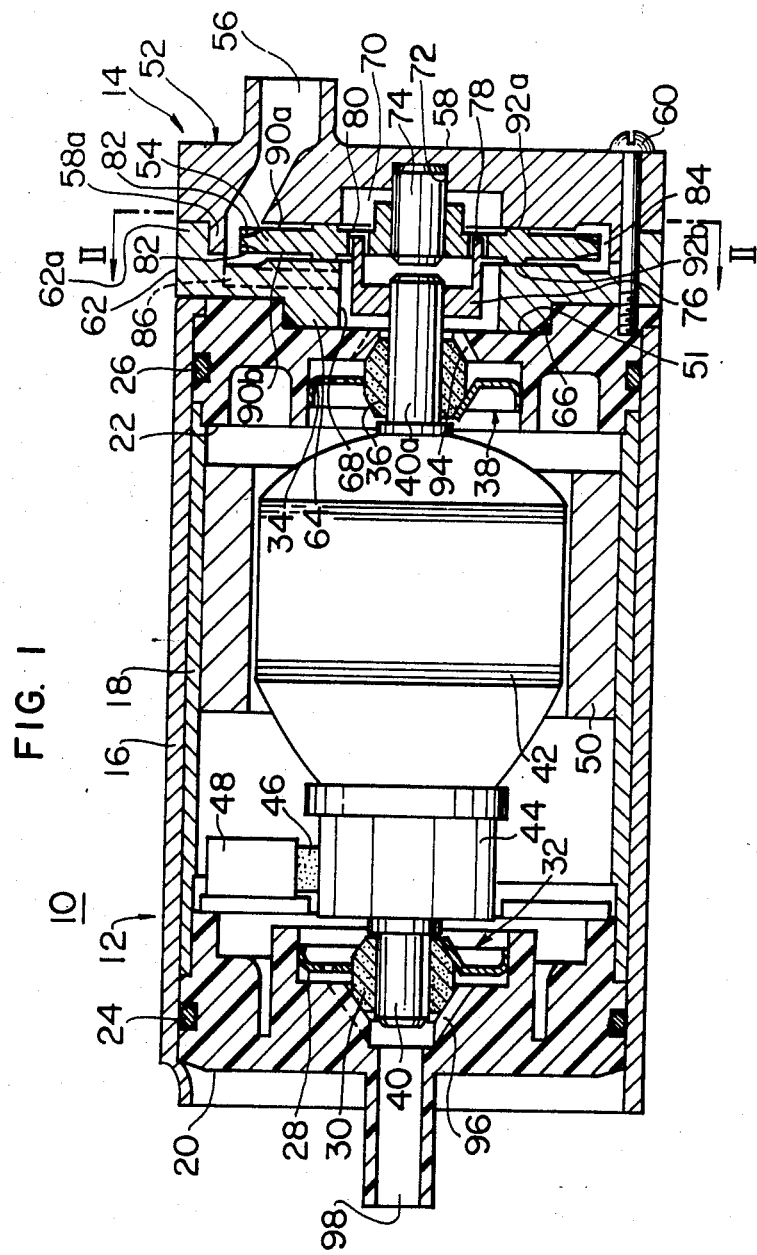
FIG. 1 is an axial sectional view of an embodiment of the electrically operated fuel pump according to the present invention.

Referring first to FIG. 1, an electrically operated fuel pump apparatus is generally designated by 10 and comprises an electric motor 12 and a regenerative pump 14. The motor 12 includes a cylindrical casing 16, a motor housing 18 snugly received in the casing 16 and end walls or bearing holders 20 and 22 partly fitted into the opposite ends of the housing 18. In the illustrated embodiment of the invention, the bearing holders 20 and 22 are made of a plastic material and also act as end walls of the motor housing. A pair of "O" rings 24 and 26 are respectively interposed between the outer peripheries of the bearing holders 20 and 22 and the inner peripheral surface of the casing 16.

A rocking washer 28 and a bearing member 30 of a sintered metal are mounted on the inner surface of the bearing holder 20 to form a self-aligning bearing 32. Similarly, a second rocking washer 34 and a second bearing member 36 of a sintered metal are mounted on the inner surface of the second bearing holder 22 to form a second self-aligning bearing 38. The first and second self-aligning bearings 32 and 38 rotatably support a motor shaft 40 on which an armature 42 and a commutator 44 are mounted for rotation with the motor shaft. A brush 46 is mounted on the bearing holder 20 by a brush holder 48. Permanent magnets 50 are secured to the inner peripheral surface of the motor housing 18 by any conventional securing means such as an adhesive. The motor shaft 40 has an end 40a extending outwardly through a central opening in the bearing holder 22 into a circular recess 51 formed in the outer end face of the bearing holder 22 and having a circular inner peripheral surface which is concentric to the axis of the motor shaft 40.

The pump 14 includes a pump housing 52 and an impeller 54 disposed therein. The pump housing 52 comprises a first section 58 providing a first pump housing end wall formed therein with a suction port 56 and a second section 62 fitted to the first section 58 and secured therewith to the bearing holder 22 of the motor 12 by means of bolts 60 extending through the pump housing sections 58 and 62 and screwed into the motor bearing holder 22. The second pump housing section 62 provides a second pump housing end wall having an axially inwardly extending annular projection 64 which is tightly fitted into the circular recess 51 in the motor bearing holder 22 to position the pump housing 52 substantially coaxially relative to the motor bearing holder 22. An "O" ring 66 is interposed between the motor bearing holder 22 and the second pump housing section 62. It is not required to highly accurately position the pump housing 52 coaxially relative to the motor bearing holder 22 for the reasons to be made apparent later.

The second pump housing section 62 is formed therein with a central axial through-hole 68 which is concentric to and of the same diameter as that of the inner peripheral surface of annular projection 64. The end 40a of the motor shaft 40 extends into the through-hole 68. The first pump housing section 58 has an inner end face formed therein with a circular recess 70 which is substantially coaxial with the through-hole 68. The recess 70 has a bottom face in which is formed a shaft hole 72 concentric to the recess 70. An impeller shaft 74 is tightly fitted into the shaft hole 72. The impeller 54 is mounted on the impeller shaft 74 for rotation and axial movement relative to the shaft.

Figure 3:
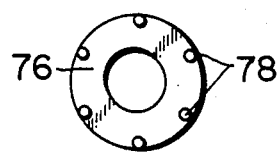
FIG. 3 is an end view of a joint member.
Figure 4:
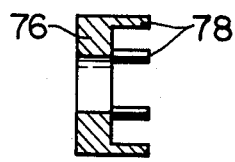
FIG. 4 is an axial sectional view of the joint member shown in FIG. 3.

A generally ring-shaped joint member 76, best shown in FIGS. 3 and 4, is disposed in the axial through-hole 68 and secured to the end 40a of the motor shaft 40. The joint member 76 has a ring-like body and a plurality of rod-like projections or rods 78 extending from an end face of the ring-like body and circularly arranged at equal intervals. These rods 78 axially extend into and engage loosely with axial apertures 80 formed in the impeller 54 and extending therethrough to provide fluid-flow communication between the recess 70 and the axial through-hole 68.

Figure 2:
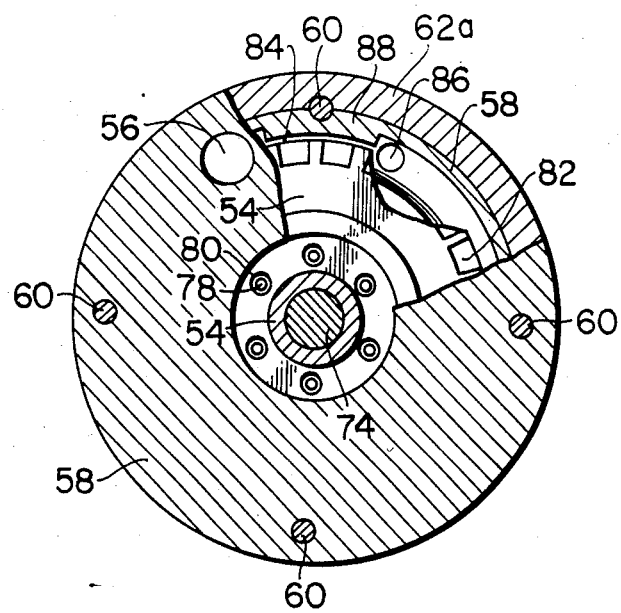
FIG. 2 is a cross-sectional view of a pump of the pump apparatus shown in FIG. 1 taken substantially along line II—II in FIG. 1 with a part of a pump housing being broken away to show the inner structure of the pump.

The impeller 54 is provided with circumferential rows of circumferentially spaced radial vane grooves 82 formed in the opposite end faces of the impeller adjacent to the outer periphery thereof so that the vane grooves operate to pump the fluid. The grooved outer marginal section of the impeller 54 and the pump housing 52 cooperate together to define a circumferential fluid passage 84 which is communicated not only with the suction port 56 but also with a discharge port 86 formed in the inner or second section 62 of the pump housing 52. As will be seen in FIG. 2, the suction and discharge ports 56 and 86 are spaced cicumferentially of the impeller 54. The second section 62 of the pump housing has an integral portion 88 which extends into the circumferential fluid passage 84 between the suction and discharge ports 56 and 86 to form a circumferential partition, as will be seen in FIG. 2. In other words, the cicumferential fluid passage 84 is circumferentially interrupted by the partition 88.

In the illustrated embodiment of the invention, the first and second sections 58 and 62 of the pump housing 52 are engaged such that a cylindrical end portion 58a of the first section 58 is fitted into a mating cylindrical end portion 62a of the second section 62 so that the inner peripheral surface of the circumferential fluid passage 84 and the circumferential partition 88 are formed by the inner peripheral surface of the cylindrical inner end portion 58a of the first pump housing section 58. In addition, the pump is constructed such that the impeller shaft 74 is fixed to the first section 58 of the pump housing, as described previously. Thus, the working or machining of the inner peripheral surface of the circumferential fluid passage 84 and the inner surface of the circumferential partition 88 can be conducted after the impeller shaft 74 has been secured to the first pump housing section 58. Thus, these surfaces can have a high concentricity relative to the axis of the impeller shaft 74. Moreover, the impeller 54 is mounted on the impeller shaft 74 by engagement between the inner peripheral surface of a shaft hole in the impeller and the outer peripheral surface of the impeller shaft. Moreover, these two surfaces can be worked precisely. For the above reasons, the radial and side clearances between the impeller 54 and the pump housing 52 can be accurately controlled.

The pump 14 is of the type that is so-called "regenerative pump" which is designed to produce such a high discharge pressure as is required for a fuel pump used in an electronically controlled fuel injection system for an internal combustion engine. For this purpose, the pump 14 is provided with first and second sets of sealing sections 90a and 90b and 92a and 92b between the opposite end faces of the impeller 54 and the adjacent inner surfaces of the pump housing 52 to seal radially outward flows of fluid from the recess 70 and axial through-hole 68 toward the circumferential fluid passage 84. The side clearances or gaps between the impeller end faces and the mating inner surfaces of the pump housing at the first sealing sections 90a and 90b are usually as small as from 30 to 60 microns but are exaggerated in the drawings. The side clearances between the impeller and the pump housing at the second set of sealing sections 92a and 92b are smaller than those at the first set of sealing sections, in fact too small to be shown in the drawings without excessive exaggeration. In addition, the circumferential partition 88 cooperates with the outer periphery of the impeller 54 to form a third sealing section between the suction and discharge ports 56 and 86. The radial clearance between the impeller and the pump housing at the third sealing section is of a very small or minute dimension but is exaggerated in the drawings.

The discharge port 86 formed in the second section 62 of the pump housing 52 is communicated with the axial through-hole 68 which in turn is communicated with the interior space in the motor 12 through fuel passages 94 formed in the bearing holder 22 around the bearing member 36 so that pressurized fuel discharged from the circumferential passage 84 through the discharge port 86 flows into the motor interior space. The other bearing holder 20 is formed therein with fuel passages 96 around the bearing member 30 and also formed with a fuel delivery port 98 communicated with the fuel passages 96.

The fuel port 10 of the construction and arrangement described above is usually installed in a fuel tank of a vehicle.

In operation, when the brush 46 is supplied with an electric current, the armature 42 is rotated with the shaft 40. The rotation is transmitted through the axial rods 78 of the joint member 76 to the impeller 54 so that the fuel is sucked through the suction port 56 into the circumferential passage 84 and pressurized to a pressure level of from about 3 to about 4 Kg/cm$^2$ and is then discharged through the discharge port 86 and the fuel passages 94 into the space within the motor 12. The fuel then flows through the space between the armature 42 and the magnets 50 while cooling the armature and is then discharged through the discharge passages 96 and the delivery port 98 into a conduit (not shown) connected to the port 98 so that the pressurized fuel is fed to fuel injectors (not shown) mounted on an engine.

In the pump 14 described above, the sealing function in the radial direction is performed by the first and second sets of sealing sections 90a, 90b, 92a and 92b, whereas the sealing function in the circumferential direction is performed by the third sealing section between the circumferential partition 88 and the grooved outer periphery of the impeller 54. In addition, the axial apertures 80 formed in the impeller 54 communicate the recess 70 on one side of the impeller to the axial through-hole 68 on the other side of the impeller to equalize the fluid pressures on the opposite sides of the impeller. Thus, the impeller is not subjected to any unduly unbalanced axial thrust force. Accordingly, the side clearances at the first and second sealing sections are kept substantially equal. Therefore, the impeller can be kept out of contact with any of the inner surfaces of the pump housing during normal pump operation.

As described, the impeller 54 of the pump 14 of the pump apparatus 10 according to the present invention is mounted on the impeller shaft 74 which is provided independently or separately of the shaft 40 of the motor 12. The motor shaft 40 is drivingly connected to the impeller by the joint 76 which is operative to transmit the rotation of the motor shaft to the impeller while allowing the impeller to move axially. Due to these features of the invention, the precision of the pump section of the pump apparatus is not adversely affected by the problem of working accuracy of the motor section of the apparatus and by the problem of the precision at the connection between the motor and pump housings. Stated more specifically, in order to enable the pump to provide a high performance, the radial and side clearances between the pump impeller and housing must be so controlled as to fall within limited ranges of dimensions. This can be achieved by precisely working the component parts of the pump section 14 only. The component parts of the motor section 12 and the parts of the motor and pump housings to be connected together may be worked with a relatively low degree of precision without adversely affecting the performance of the pump apparatus. Thus, it is now unnecessary to regard it essential or important to precisely work the motor housing and bearings. In addition, it is now possible to employ flexible bearing mechanisms such as self-aligning bearings 32 and 38 at the bearing sections of the motor, which greatly facilitates the assembling of the motor section 12 with the pump section 14 and thus reduces the cost of manufacture of the pump apparatus 10. Moreover, the recess 51 and the projection 64 used to connect the motor section 12 to the pump section 14 and the cylindrical portions 58a and 62a used to connect the first and second sections 58 and 62 of the pump housing 52 do not need to be worked with a high degree of precision provided that, when the motor and pump sections are assembled, the axial rods 78 of the joint member 76 can be smoothly inserted into the axial apertures 80 in the impeller 54.

In the described and illustrated embodiment of the invention, the impeller shaft 74 is fitted into a shaft hole 72 formed in the first section 58 of the pump housing. The impeller shaft, however, may alternatively be integral with the first pump housing section 58. Further alternatively, the first pump housing section 58 may be provided thereon with a bearing (not shown) for rotatably supporting an impeller shaft which may be either integral with the impeller or secured thereto.

In order to reduce torque loss due to friction between the impeller and the impeller shaft, a slit or slits (not shown) may be formed either in the inner peripheral surface of the shaft hole in the impeller or in the outer peripheral surface of the impeller shaft.

What is claimed is:

1. An electric motor and a fuel pump assembly comprising:
    a regenerative pump including a first housing and an impeller rotatably mounted therein;
    an electric motor including a second housing and a motor shaft;
    a pair of bearings rotatably supporting said motor shaft on opposite end walls of said second housing, said motor shaft having an end portion extending outwardly beyond one of said end walls of said second housing;
    said first housing being substantially aligned with said second housing and having one end wall fixed to said one end wall of said second housing;
    a second shaft provided independently of said motor shaft and fixed only at one end to the other end wall of said fist housing to rotatably support said impeller thereon;
    said impeller being not fixed to said second shaft axially thereof;
    said impeller and said first housing being arranged such that the opposite sides of said impeller and the end walls of said first housing are disposed in substantially liquid-sealing but slidable relationship with each other;
    said one end wall of said first housing being formed therein with a through-hole; and
    joint means in said through-hole fixed to said end portion of said motor shaft and loosely but drivingly connected to said impeller for transmitting rotation of said motor shaft to said impeller, whereby ssaid regenerative pump and said electric motor can be assembled separately and then connected together into said assembly.

2. A pump apparatus as claimed in claim 1, wherein said joint means comprises a joint member secured to said motor shaft adjacent to said impeller, said joint member and said impeller being so shaped and arranged as to provide a torque-transmitting connection therebetween.

3. A pump apparatus as claimed in claim 2, wherein said impeller is formed therein with at least one axial aperture and said joint member is provided with an axial rod extending into said aperture for relative movement between said rod and said impeller.

* * * * *